April 21, 1925.  1,534,671
H. J. STEAD
METHOD OF PRODUCING FINISHED SURFACES UPON GLASS
Filed Aug. 31, 1922   2 Sheets-Sheet 1
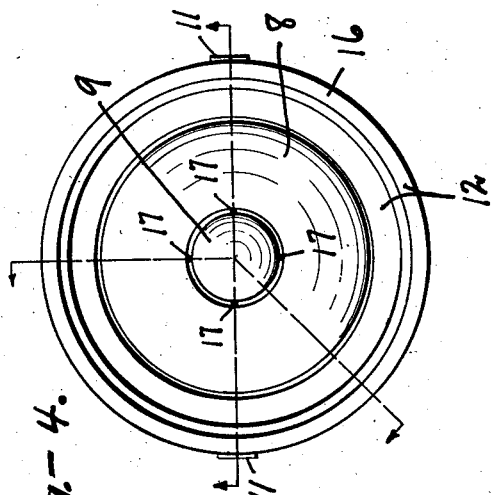
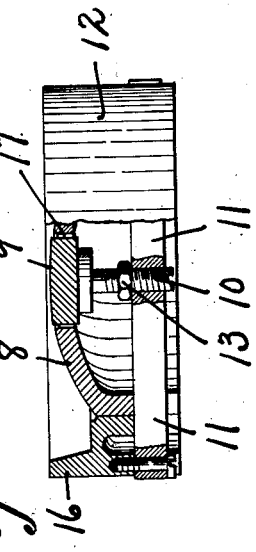
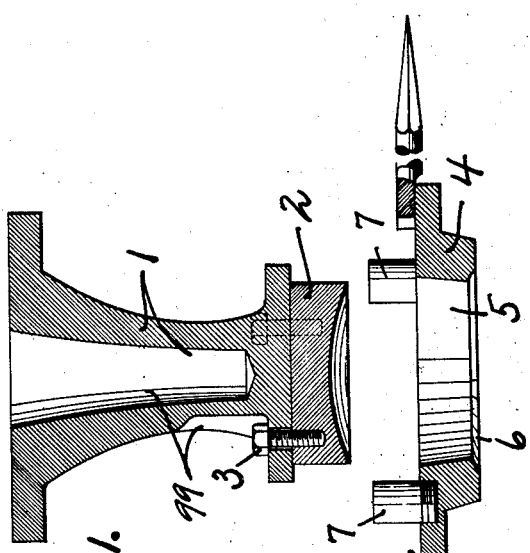
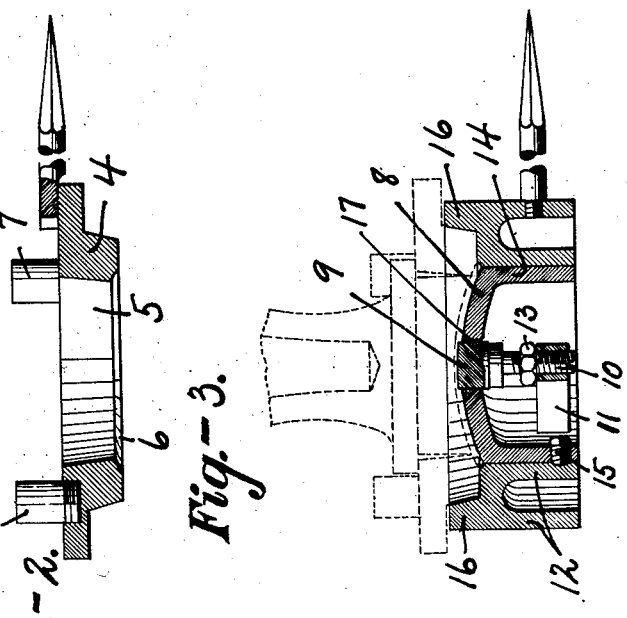

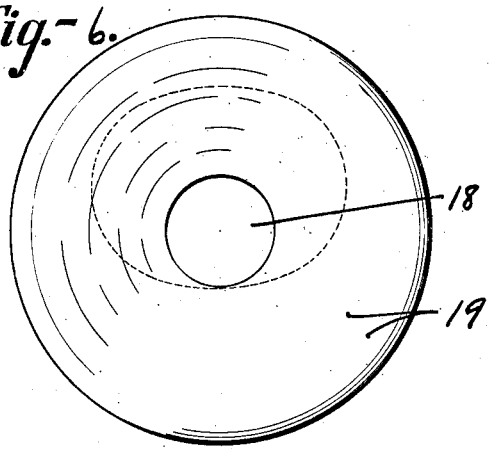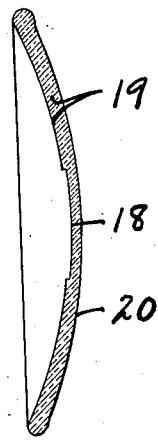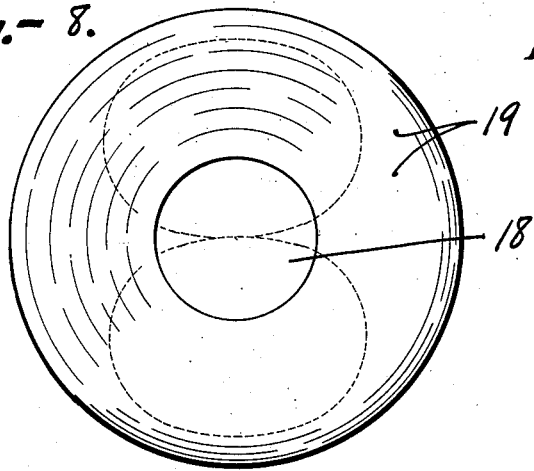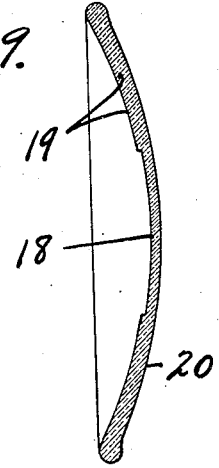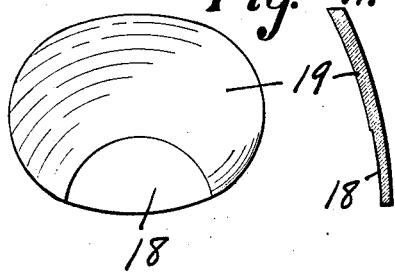

Patented Apr. 21, 1925.

1,534,671

UNITED STATES PATENT OFFICE.

HAROLD J. STEAD, OF GENEVA, NEW YORK.

METHOD OF PRODUCING FINISHED SURFACES UPON GLASS.

Application filed August 31, 1922. Serial No. 585,406.

*To all whom it may concern:*

Be it known that I, HAROLD J. STEAD, of Geneva, in the county of Ontario, in the State of New York, have invented new and useful Improvements in Methods of Producing Finished Surfaces upon Glass, of which the following, taken in connection with the accompanying drawings, is a full, clear, and exact description.

This invention relates to a method of molding a finished surface upon glass, and to the product of that process and reference is made to my copending application, Serial No. 454627, filed March 23, 1921.

So far as I am aware, finished surfaces have heretofore been produced upon glass by means of grinding and polishing, and no one to my knowledge has heretofore produced a finished surface by molding alone, and by "finished surface" I mean a surface of exceedingly accurate form and of considerable polish, whether it be a flat, spherical or other surface.

I have discovered that a finished surface can be produced upon glass when the same is treated in a particular way by means of molds of particular character, and I have produced molded spherical surfaces of such an accurate character that they are satisfactory for visual purposes, that is, for the purpose of manufacturing optical lenses without grinding and polishing, although it may be desirable in certain cases to polish the surface slightly.

The product of this invention has marked advantages over a ground and polished surface, as for instance, the particular character of the molded surface. One particular advantage resides in the so-called fire-polish, which is produced by the surface tension of the glass when it is in a molten or semi-molten condition.

Another advantage resides in the fact that in the event of the production of any irregularities in the surface of the glass, caused, for instance, by imperfections of the mold surface or dust particles, the heat which the glass still retains even after the mold is removed from contact, is sufficient to permit the surface of the glass to be closely and finely knitted by the action of the surface tension, and in this way differs materially from a ground and polished surface.

My invention is, however, applicable to the production of a finished surface upon glass for any purposes, such as optical lenses, headlight lenses, semaphore lenses, magnifying glasses, and any article of glass upon which the finished surface of a flat or spherical character may be desired.

For the purpose of illustration, however, I have disclosed a specific method of molding a finished surface upon a particular article, viz: the visual surface of a bifocal lens, particularly the visual surface used for reading or near vision when formed at the central portion of a blank of glass, the outer eccentric portion of which is adapted for forming the distance portion of said bifocal lens when properly ground and polished. In this particular disclosure, no attempt is made to produce two finished surfaces at the same time by molding.

In practicing my process, it is necessary to utilize a mold or a mold section for forming said finished surface that is formed of a material having the following characteristics:

First. The material should be dense, non-porous, homogeneous and as fine in texture as can practically be produced, approximating in those respects the physical characteristics of glass itself.

Second. The material should be of a non-oxidizing character, and generally of high chemical stability.

Third. The material should not deteriorate or decompose at high temperature, such as 600 degrees F.

Fourth. The material must be hard at red heat or high temperatures approximating 600 degrees F. so as to resist scratching and other changes of form at all times.

Fifth. The material at high temperature, such as that specified, must be capable of withstanding a pressure approximating five tons per square inch without yielding or changing its form in the most minute particular.

Sixth. The material must be capable of accepting as perfect, or practically as perfect a polish as glass itself for the reason that under proper conditions the finish on the mold will be faithfully duplicated or reproduced upon the surface of the glass article molded.

Seventh. The material must be tough, and not too brittle.

Eighth. The material must not stick, or unite with glass at the same or approximately the same temperature as the glass when placed in or upon the mold.

The best material of which I am aware at the present time conforming most completely to the specifications given above, is the alloy known as "stellite," one analysis of a suitable alloy being approximately as follows, altho in practice, the composition varies somewhat:

|  | Per cent. |
|---|---|
| Cobalt | 60.80 |
| Molybdenum | 24.19 |
| Chromium | 13.20 |
| Manganese | .55 |

The alloy should be accurately shaped as a counterpart of the surface it is desired to produce. The accurately shaped surface is then given a high polish. The molds may be made in sections, one of the mold sections being preferably mounted on a plunger by means of which the glass material is accurately shaped between the mold sections under high pressure, in this instance, a pressure approximating 10,000 pounds per square inch.

The mold section should be heated to a temperature of, or closely approximating the temperature of the glass to be molded so that the heated glass when brought into contact with the mold will not be chilled, or suddenly cooled, resulting in cracking or wrinkling of the glass. This heating may be effected in any suitable way, as for instance, by the repeated application of glass heated to the desired temperature.

In the drawings, I have illustrated, as before stated, a specific application of my process to a most difficult subject, viz: the production of one surface of a bifocal lens, but it should be understood that such application is merely illustrative.

Figure 1 is a vertical sectional view of the movable pressure-applying section of the mold.

Figure 2 is a sectional view of the intermediate mold section.

Figure 3 is a sectional view of the bottom mold section.

Figure 4 is a top plan view of the mold section shown in Figure 3 with slight modifications.

Figure 5 is a view partially in section of the mold section illustrated in Figure 4.

Figure 6 is a plan view of a molded blank of my invention.

Figure 7 is a sectional view of the same.

Figure 8 is a plan view of a modified form of molded blank of my invention.

Figure 9 is a sectional view of the same.

Figure 10 is a view of a completed lens.

Figure 11 is a sectional view through the lens of Figure 10.

One suitable mold for the lens blank shown in Figures 6 and 7 is disclosed in Figures 1, 2 and 3. The molding position of such mold section being indicated in dotted lines, Figure 3. As shown, the structure may comprise a plunger frame —1— adapted to fit a standard press, and having a temperature controlling cavity —99— of such form and shape as to produce walls capable of radiating heat at desired speed without too rapid cooling. This plunger frame carries a plunger mold section —2— which may be secured thereto in any suitable manner, as by screws —3—, the surface of this plunger mold section being preferably ground to give the resultant glass blanks a smooth exterior. The intermediate mold section —4— is in the form of a ring within the central opening of which the plunger mold —2— is adapted to move, and preferably the main portion of the inner wall —5— of the section —4— is tapered downwardly, and at its upper edge is of somewhat greater diameter than the exterior diameter of the plunger mold. The lower portion of the interior wall of the section —4— is recessed at —6— to shape the edge of the glass to the form of blank desired. Studs —7— may be provided for guiding the plunger frame.

The mold for shaping the bifocal side of the blank may comprise preferably a substantially circular concavo-convex mold section —8— having an opening at its center thru which the mold section —9— extends, the said two mold sections being adapted for shaping moldable glass material in form to constitute a bifocal lens blank. Preferably the section —8— is adapted to more or less accurately shape the portion of said blank adapted to constitute the field for distance vision, while the section —9— is capable of and adapted to mold a relatively small accurately shaped finished surface constituting the near vision field of a bifocal lens without the necessity of any grinding operation being performed thereon, and without the usual polishing requirement, altho a certain amount of polishing may be necessary or desirable.

As illustrated, the section —9— is adjustably supported within the section —8— and for this purpose it may be mounted on a screw —10— adjustable through the cross-bar —11—, which cross-bar has its ends supported by and secured to the mold-supporting section —12—. Preferably the screw —10— is provided with a lock nut —13— for positively maintaining the section —9— in proper relation with respect to the section —8— to produce the desired difference in elevation of the contiguous molded surfaces.

As illustrated, the mold section —8— is formed with a cylindrical flange —14— which fits within the annular supporting section —12— and may be locked thereto in any suitable manner, as by set screws —15—. It will be noted that the mold section —8— is in effect a hollow member of substantially cup form and that the supporting section —12— is in like manner formed with an annular recess, making the body of said section of substantially U-shaped form in cross-section, such formation of the parts producing metallic walls of proper thickness to effect the desired heat transfer without effecting too rapid cooling of the glass material to be molded.

The section —12— has a flange —16— which projects some distance above the mold section —8— and is spaced radially and outwardly therefrom to form with said mold sections a receptacle for the heated glass. For the purpose of releasing the air about the mold section —9—, the section —8— is formed with one or more edge grooves or axial recesses —17— bordering the opening thru which the mold section —9— extends, so as to form one or more conduits of relatively small size surrounding the section —9— for conveying any air which is trapped between the molten glass and the said mold sections.

The glass blank to be molded should have its surface which is to contact with the mold section —9— polished, and it will be obvious that when the blank heated to a proper degree is placed upon the mold section —8— and —9— also heated to the desired temperature with its polished surface toward said sections and the intermediate mold section —4— is brought into proper position and the plunger frame carrying the plunger mold is moved downwardly under high pressure, as described, and into contact with the heated blank, and sufficient pressure is exerted upon said blank so as to make its lower surface conform accurately to the molding surfaces constituted by the mold sections —8— and —9—, that an annular section of said glass blank will be molded to constitute a counterpart of the mold section —8— and a circular section of said blank will be molded within the said annular section constituting a counterpart of the accurately shaped polished section —9—, and depressed with relation to said annular surrounding section to form a finished surface that will not require any grinding to adapt it for optical purposes.

Preferably, as stated, the metal known as stellite and having approximately the above analysis is so far as my present experience goes, the best known material for producing a mold section —9— capable of shaping a finished optical surface. The extent of the depression of the central circular surface of the blank below the surrounding annular surface of said blank can be readily adjusted by movement of the screw —10—, and should be sufficient to permit grinding and polishing of the annular surrounding surface by ordinary tools without them coming into contact with the finished central surface.

The blank so produced comprises a bifocal surface having a central finished optical surface, a surrounding and elevated surface molded to an approximate curvature and the opposite face of said blank is also molded to an approximate curvature.

The mold shown in Figures 1, 2 and 3 is illustrated as adapted to form the lens blank of Figures 6 and 7, and in which the circular depressed finished surface —18— is of a size adapted to form the reading vision surface of a single lens, while in Figures 4 and 5, a somewhat larger molding apparatus is shown as adapted for forming the blank of Figures 8 and 9, capable of being cut to form the near vision surface of two separate lenses as indicated in dotted lines.

The blank so produced should be treated in the following manner to produce a finished lens:—

The central finished surface —18— should be covered with a self-hardening protective material, such as liquid celluloid. By reason of the relative elevation of the outer surface —19— above the central surface —18— the former may be ground by the ordinary tools of the trade, care always being exercised not to carry the grinding far enough so that the tool comes in contact with the finished surface —18— so that the two surfaces are maintained in the completed lens at different elevations, altho the difference in elevation is materially less than at the completion of the molding operation.

The outer surface —19— may then be polished by the ordinary optical tools, and if desired, the central surface —18— may be somewhat polished, altho it already has a fire polish which in many instances is in itself sufficient.

The opposite surface of the blank may then be ground or the completed lens may be cut from the blank, particularly when the blank is of such a size as to be capable of forming two lenses and the grinding and polishing of the surface —19— and of the outer surface —20— may be effected subsequently to the division of the blank into two separate lens blanks.

The completed lens comprises upon its bifocal surface which is preferably the concaved surface, altho it may be the convex one, two optical surfaces preferably at different elevations, one of the same produced by grinding and the other produced by molding.

As before stated, the disclosure of the method of forming a finished molded surface for a bifocal lens is merely illustrative of the method of molding and the production of a finished surface for any purpose by molding, and altho I have shown and described a specific molding apparatus as capable of carrying out my invention and specific materials, as at present considered preferable, I do not desire to limit myself to the details of the apparatus or the method, as various changes may be made in each without departing from the invention as set forth in the appended claims, and I believe that I am the first to produce a bifocal lens blank having a finished central optical surface depressed below a surrounding unfinished approximately shaped surface adapted to be subsequently ground and polished.

What I claim is:

1. The method of producing a bifocal lens blank comprising heating a glass material to a moldable temperature, bringing into contact with said heated glass material a highly polished metallic mold section under sufficient pressure to produce at the central portion of the resultant blank an optical surface suitable for visual purposes without grinding, and depressed below the surrounding surface of the blank.

2. The method of producing a bifocal lens blank comprising heating a glass material to a moldable temperature, bringing into contact with said heated glass material a highly polished metallic mold section under sufficient pressure to produce at the central portion of the resultant blank an optical surface suitable for visual purposes without grinding, and then grinding and polishing the surrounding surface of the blank.

3. The method of producing a bifocal lens blank comprising heating a glass material to a moldable temperature, bringing into contact with said heated glass material a highly polished metallic mold section under sufficient pressure to produce at the central portion of the resultant blank an optical surface suitable for visual purposes without grinding, and depressed below the surrounding surface of the blank, and then grinding and polishing the surrounding surface of the blank.

4. The method of producing a bifocal lens comprising heating a glass material to a moldable temperature, bringing into contact with said heated glass material a highly polished metallic mold section under sufficient pressure to produce at the central portion of the resultant blank an optical surface suitable for visual purposes without grinding, and then grinding and polishing the opposite surface of the blank.

5. The method of producing a bifocal lens comprising heating a glass material to a moldable temperature, bringing into contact with said heated glass material a highly polished metallic mold section under sufficient pressure to produce at the central portion of the resultant blank an optical surface suitable for visual purposes without grinding, and depressed below the surrounding surface of the blank, and then grinding and polishing the opposite surface of the blank.

6. The method of producing a bifocal lens comprising heating a glass material to a moldable temperature, bringing into contact with said heated glass material a highly polished metallic mold section under sufficient pressure to produce at the central portion of the resultant blank an optical surface suitable for visual purposes without grinding, then grinding and polishing the surrounding surface of the blank, and then grinding and polishing the opposite surface of the blank.

7. The method of producing a bifocal lens blank comprising heating a glass material to a moldable temperature, bringing into contact with said heated glass material a highly polished metallic mold section under sufficient pressure to produce at the central portion of the resultant blank an optical surface suitable for visual purposes without grinding, and depressed below the surrounding surface of the blank, then grinding and polishing the surrounding surface of the blank, and then grinding and polishing the opposite surface of the blank.

8. The method of producing a bifocal lens blank comprising heating a glass material to a moldable temperature, bringing into contact with said heated glass material a highly polished metallic mold section under pressure sufficient to produce at the central portion of the resultant blank an optical surface suitable for visual purposes without grinding, and simultaneously bringing into contact with said glass material another comparatively large mold section to form about said central portion an outer surface molded an approximate curvature, and elevated above the central optical surface, and then grinding and polishing said outer surface.

In witness whereof I have hereunto set my hand this 16th day of August 1922.

HAROLD J. STEAD.

Witnesses:
M. H. SANDFORD,
E. A. THOMPSON.